US008930130B2

(12) United States Patent
Courteville et al.

(10) Patent No.: US 8,930,130 B2
(45) Date of Patent: Jan. 6, 2015

(54) METHOD FOR CONSTRUCTING A TRAJECTORY OF AN AIRCRAFT BY STATE VECTOR

(71) Applicant: Thales, Neuilly-sur-Seine (FR)

(72) Inventors: Romain Courteville, Valence (FR); Bertrand Barnetche, Valence (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/950,187

(22) Filed: Jul. 24, 2013

(65) Prior Publication Data
US 2014/0032095 A1 Jan. 30, 2014

(30) Foreign Application Priority Data

Jul. 27, 2012 (FR) ...................................... 12 02124

(51) Int. Cl.
*G01C 21/00* (2006.01)
*G08G 5/00* (2006.01)
*G01C 23/00* (2006.01)
*G05D 1/10* (2006.01)

(52) U.S. Cl.
CPC ................ *G01C 21/00* (2013.01); *G05D 1/101* (2013.01); *G08G 5/0034* (2013.01); *G01C 23/00* (2013.01); *G08G 5/0039* (2013.01)
USPC ................ 701/400; 701/3; 701/120; 701/467

(58) Field of Classification Search
None
See application file for complete search history.

(56) References Cited

U.S. PATENT DOCUMENTS

| 5,646,854 | A | * | 7/1997 | Bevan | ............................... 701/3 |
| 6,163,744 | A | | 12/2000 | Onken et al. | |
| 6,246,957 | B1 | | 6/2001 | Barrer et al. | |
| 2003/0088360 | A1 | * | 5/2003 | Ikhlef et al. | .................. 701/202 |
| 2008/0140273 | A1 | * | 6/2008 | Deker | ............................ 701/14 |
| 2008/0177431 | A1 | | 7/2008 | Coulmeau et al. | |
| 2009/0005967 | A1 | * | 1/2009 | Rumbo et al. | ................ 701/202 |

(Continued)

FOREIGN PATENT DOCUMENTS

| EP | 2474812 A2 | 7/2012 |
| FR | 2909460 A1 | 6/2008 |

OTHER PUBLICATIONS

Babaei, A.R. and Mortazavi, M. "Three-Dimensional Curvature-Constrained Trajectory Planning Based on In-Flight Waypoints". Journal of Aircraft, vol. 47, No. 4, Jul.-Aug. 2010.*

(Continued)

*Primary Examiner* — John R Olszewski
*Assistant Examiner* — Jeffrey Boomer
(74) *Attorney, Agent, or Firm* — Baker & Hostetler LLP

(57) ABSTRACT

A method for constructing a flight trajectory of an aircraft, comprises a step of computing a sequence of state vectors ($E_i$) representing the trajectory of the aircraft; a state vector ($E_{i+1}$) being determined on the basis of the state vector ($E_i$) preceding it by means of: a step of computing the speed components ($V_{i+1}$), consisting in determining: a flight setpoint, by selecting an objective navigation point, a joining strategy adapted to the flight setpoint and to the flight domain ($D_V$) by means of a predefined library ($L_{Sr}$) of joining strategies, a manoeuvre by means of the flight domain ($D_V$), making it possible to follow the joining strategy towards the flight setpoint; a step of computing the other components of the state vector ($E_{i+1}$), on the basis of the components of the speed vector ($V_{i+1}$) and of the preceding state vector ($E_i$).

11 Claims, 4 Drawing Sheets

(56) References Cited

U.S. PATENT DOCUMENTS

Figure 1:
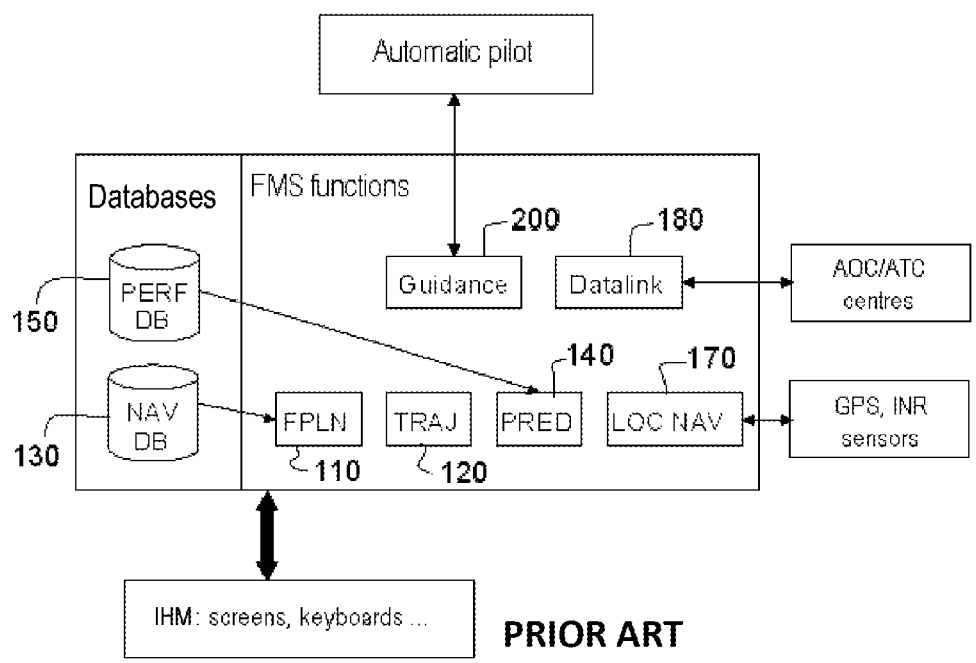

2009/0177342 A1* 7/2009 Gutierrez-Castaneda ...... 701/11
2010/0305781 A1* 12/2010 Felix ................................. 701/3
2012/0179368 A1* 7/2012 Walter ......................... 701/465
2012/0245834 A1* 9/2012 Klooster et al. ............. 701/120

OTHER PUBLICATIONS

Rodriguez et al. "A Model to 4D Descent Trajectory Guidance". 26th Digital Avionics Systems Conference. IEEE. Oct. 21, 2007.*

* cited by examiner

METHOD FOR CONSTRUCTING A TRAJECTORY OF AN AIRCRAFT BY STATE VECTOR

CROSS-REFERENCE TO RELATED APPLICATION

This application claims priority to foreign French patent application No. FR 1202124, filed on Jul. 27, 2012, the disclosure of which is incorporated by reference in its entirety.

FIELD OF THE INVENTION

The invention relates to a flight management method for the construction of a trajectory of an aircraft, by means of a sequence of state vectors indexed with respect to time, and to a trajectory computation method implementing this vector representation. It also pertains to the computation of the transitions between the various elements of a flight plan as a function of the aircraft's flight domain as well as the estimations in terms of time and fuel relating to this trajectory.

BACKGROUND

Flight management systems, commonly referred to by the acronym FMS, have in their main jobs to provide the crew with a strategic overview of their flight, this including for example the construction of a trajectory between waypoints or a precise description of the manoeuvres that the aircraft will perform to carry out the flight plan. FMS systems thus determine a set of implicit points and of segments between these waypoints. A significant role of FMS systems is the construction of a trajectory achievable as a function of a flight domain of the aircraft, and including the transitions between the various segments. A major expectation of flight management systems is the prediction of the temporal and fuel consumption aspects along this computed trajectory. What will be the transit times at the various points, what quantity of fuel will be required in order to achieve the flight, what manoeuvre is it preferable to engage under these conditions, are all questions to which an FMS system must respond.

Existing systems are being called into question on account of the constant increase in air traffic and the emergence of complex functions making it possible to save fuel and to guarantee compliance with transit times. A novel computation architecture and a breakaway mode of representation of the trajectory are thus proposed by the present invention.

In the known state of the art, the computed trajectory is split between a lateral trajectory, typically a latitude and a longitude, and a vertical profile applied to this lateral trajectory. Thus, two uncoupled modules produce two distinct trajectories, lateral and vertical, which are subsequently gathered to form an essentially geometric definition of the trajectory of the aircraft. The temporal and fuel aspects are computed subsequently, after assembling the lateral and vertical trajectories.

FIG. 1 presents the functional architecture of an FMS system according to the known state of the art. In accordance with the ARINC 702 standard, they ensure notably the functions of:

Navigation LOCNAV, 170, for performing optimal location of the aircraft as a function of the geo-location means (GPS, GALILEO, VHF radio beacons, inertial platforms, etc.), Flight plan FPLN, 110, for inputting the geographical elements constituting the skeleton of the course to be followed (departure and arrival procedures, waypoints, etc.), Navigation database NAVDB 130, for constructing geographical courses and procedures with the help of data included in the bases (points, beacons, interception or altitude legs, etc.), Performance database, PRF DB 150, containing the craft's aerodynamic and engine parameters, Lateral trajectory TRAJ, 120, for constructing a continuous trajectory on the basis of the points of the flight plan, complying with the performance of the aircraft and the confinement constraints, Predictions PRED, 140, for constructing an optimized vertical profile on the lateral trajectory, Guidance, GUID 200, for guiding in the lateral and vertical axis the aircraft on its 3D trajectory, while optimizing the speed, Digital data link DATALINK, 180, for communicating with the control centres and other aircraft.

On the basis of the flight plan FPLN defined by the pilot, a lateral trajectory is determined as a function of the geometry between the waypoints and/or the altitude and speed conditions, by means of the module TRAJ 120. On the basis of this lateral trajectory, a prediction function PRED 140 grafts the vertical flight plan elements (altitude constraint, speed constraint or wind constraint, change of cruising level, etc.), that may induce the resumption of certain parts of the lateral trajectory.

A difficulty with trajectory construction in the known systems can be illustrated by the example of the construction of the descent profile, and notably the determination of the start-of-descent ToD point, or "Top of Descent", which is the point where the aircraft terminates its cruising to start its descent towards its landing field. A specific iterative process determines this point, by a first "reverse direction" step which determines the ToD point on the basis of a hypothetical state of the aircraft at the landing point, and a second "forward" step of the state of the aircraft at the landing point starting from this estimated ToD point; the iterative process being continued until the identification of a common trajectory, in the forward direction and in the backward direction. This computation, which involves a certain number of iteration to converge to the start-of-descent point, is complex and induces a heavy load on the computing resources of the computer. According to the same principle, the construction of a continuously ascending trajectory, envisioned within the framework of the optimization of air traffic, makes it necessary to develop complex iterative processes that consume considerable computing time.

Another known difficulty resides in the resolution of discontinuities which can appear when computing the lateral trajectory. In accordance with the ARINC 424 standard, a lateral trajectory is constructed between various waypoints by stringing together standardized flight portions, generally called "legs". A lateral trajectory is determined at one and the same time by forward and backward computations, aimed at convergence; the result being a geometric trajectory. The computation of the points of convergence, between the forward and backward computations, can lead to discontinuities, both lateral and vertical.

Figure 2A:
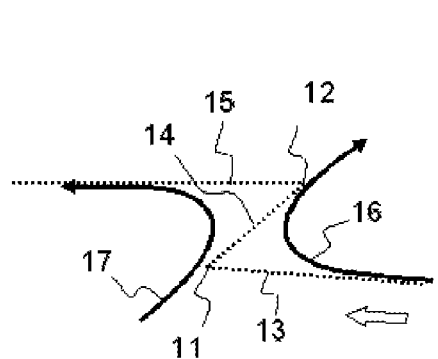
Figure 2B:
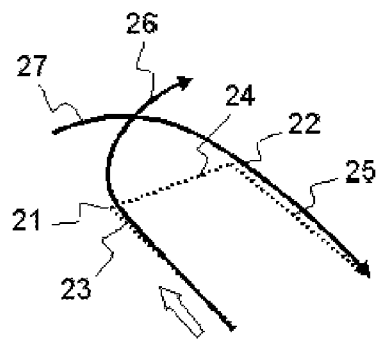

This difficulty, well known to the person skilled in the art, can be illustrated by the two conventional cases of discontinuity presented in FIGS. 2a and 2b. FIG. 2a describes a discontinuity of so-called "Bird" type. The flight plan defines a skeletal trajectory, passing through two intermediate points 11 and 12, forming three segments 13, 14 and 15. The lateral trajectory computation determines, in the forward direction, a first "leg" 16, allowing the aircraft to join the segment 14 from the segment 13. In the backward direction, the trajectory computation determines a second "leg" 17 allowing the aircraft to join the segment 15 from the segment 14. There is discontinuity between the two non-secant trajectories 16 and 17. The forward and backward trajectory computation fails to define a flyable trajectory making it possible to ensure the transition between the segment 13 and the segment 15.

FIG. 2b describes a discontinuity of so-called "Fish" type. The flight plan establishes a skeletal trajectory passing through two intermediate points 21 and 22, forming three segments 23, 24 and 25. The lateral trajectory computation determines, in the forward direction, a first "leg" 26 for joining the segment 24 from the segment 23. In the backward direction, the trajectory computation determines a second "leg" 27 allowing the aircraft to join the segment 25 from the segment 24. There is discontinuity between the two secant trajectories, 26 and 27. The forward and backward trajectory computation fails to define a flyable trajectory making it possible to ensure the transition between the segments 23 and 25.

Other cases also exist leading to such discontinuities, each of them requiring specific code elements to detect them and determine a solution in order to solve them. This results in a complex flight management system, requiring a lengthy and expensive verification and validation process.

To respond to real-time constraints, it is moreover desirable to carry out specific computations over a reduced time horizon so as to have a trajectory in a short time frame. To ensure permanent validity of the trajectory, the latter must be completely recomputed periodically, generating a computational load which monopolizes a significant share of the computational resources in the case of the known FMS systems. Lastly, moreover, the final resulting trajectory carries only a limited amount of information, typically the transit time and the fuel onboard when passing through navigation points.

SUMMARY OF THE INVENTION

The general idea of the invention pertains to a scheme for representing the trajectory in the form of a set of aircraft state vectors indexed with respect to time, and to a trajectory computation method associated with this vector representation. The invention constitutes a breakaway approach with respect to the flight trajectory construction functions available in the known flight management systems, alleviating the implementational difficulties cited hereinabove.

For this purpose, the subject of the invention is a method for constructing a flight trajectory of an aircraft, deployed in a flight management system, the said flight management system employing means for:
  determining, on the basis of a flight plan advised by the pilot, a sequence of objective navigation point; an objective navigation point being characterized at least by a geographical position,
  determining a flight domain consisting of a set of parameters defining the aerodynamic behaviour of the aircraft,
characterized in that it comprises a step of computing a sequence of state vectors representing the trajectory of the aircraft; the said state vectors having as components, at least one time, a geographical position of the aircraft and components of a speed vector of the aircraft;
a state vector being determined on the basis of the state vector preceding it in the sequence by means of:
  a step of computing the components of the speed vector, consisting in:
    determining a flight setpoint, by selecting an objective navigation point from the sequence,
    determining a joining strategy adapted to the flight setpoint and to the flight domain by means of a predefined library of joining strategies,
    determining a manoeuvre by means of the flight domain, allowing the aircraft to follow the joining strategy towards the flight setpoint,
  a step of computing the other components of the state vector, on the basis of the components of the speed vector and of the components of the preceding state vector.

The invention also pertains to a flight management system comprising instructions of codes making it possible to perform the steps of the trajectory construction method having the characteristics described above.

BRIEF DESCRIPTION OF THE ACCOMPANYING DRAWINGS

The invention will be better understood and other advantages will become apparent on reading the detailed description of the embodiments given by way of example in the following figures.

FIG. 1, already presented, represents a known flight management system, commonly called an FMS, FIGS. 2a and 2b, already presented, illustrate two known cases of discontinuities encountered during the construction of a lateral trajectory.

Figure 3:
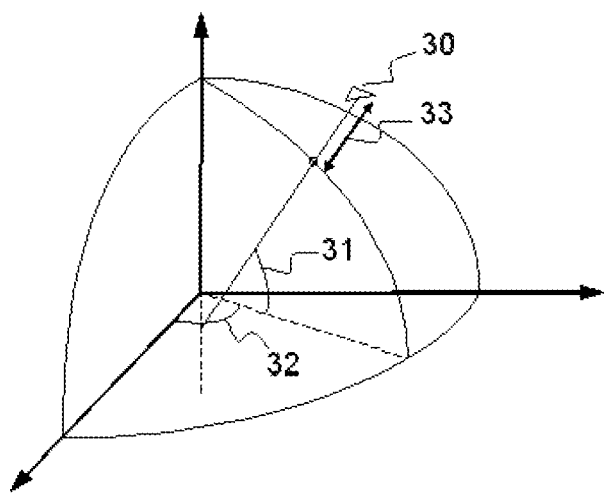
Figure 4:
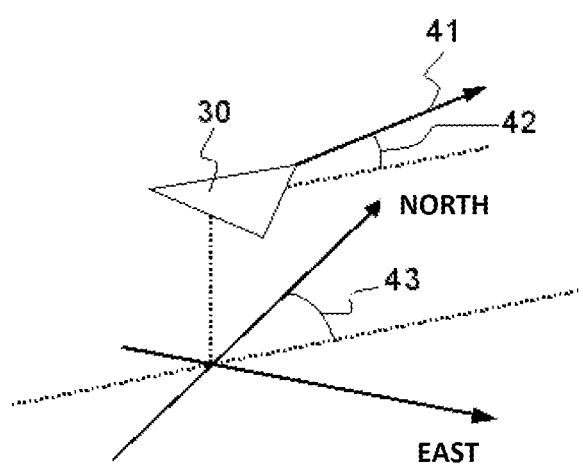
Figure 5:
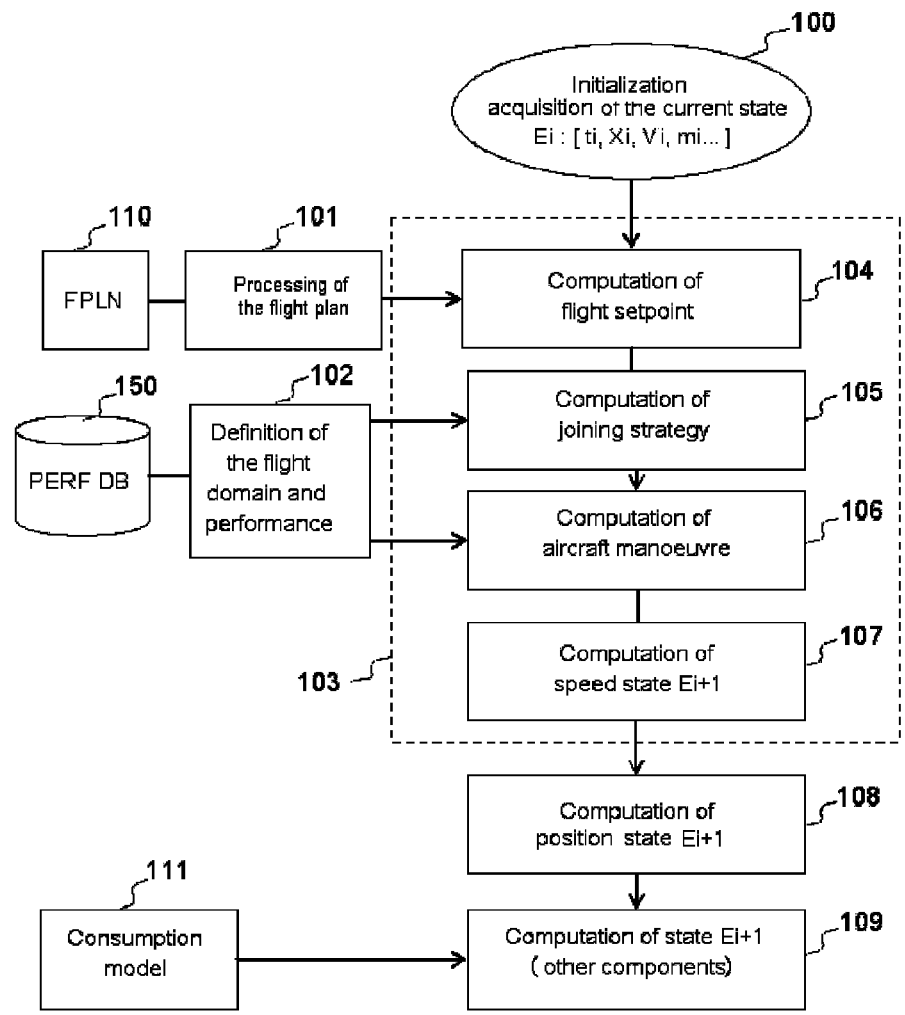
Figure 6A:
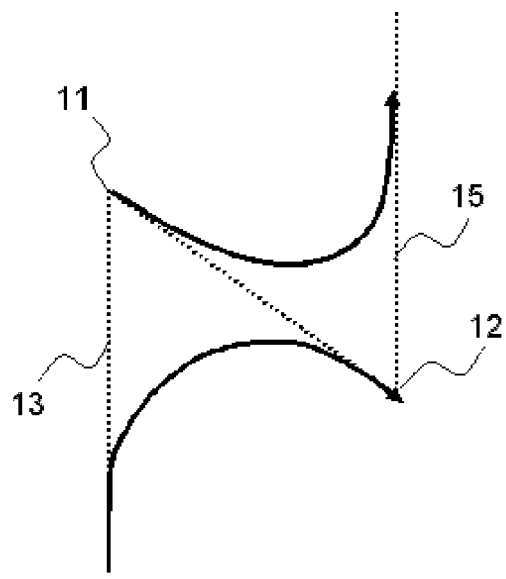
Figure 6B:
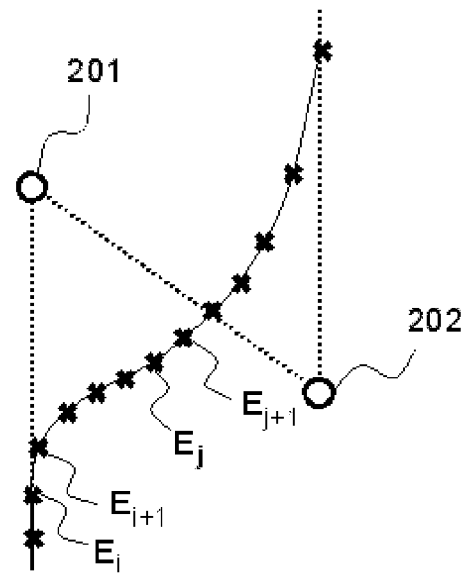
Figure 7A:
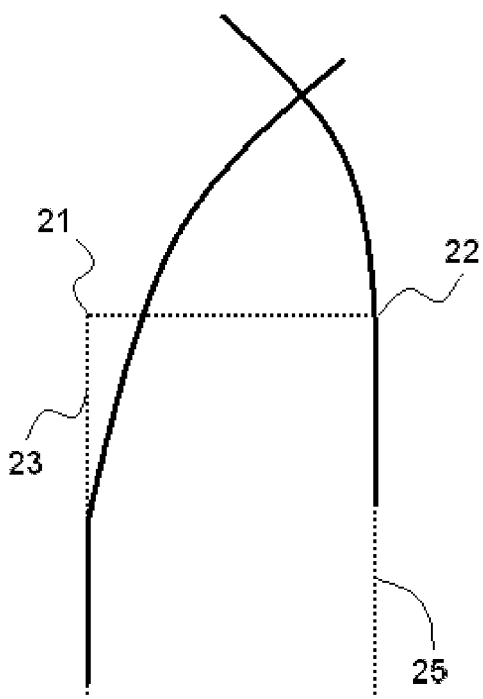
Figure 7B:
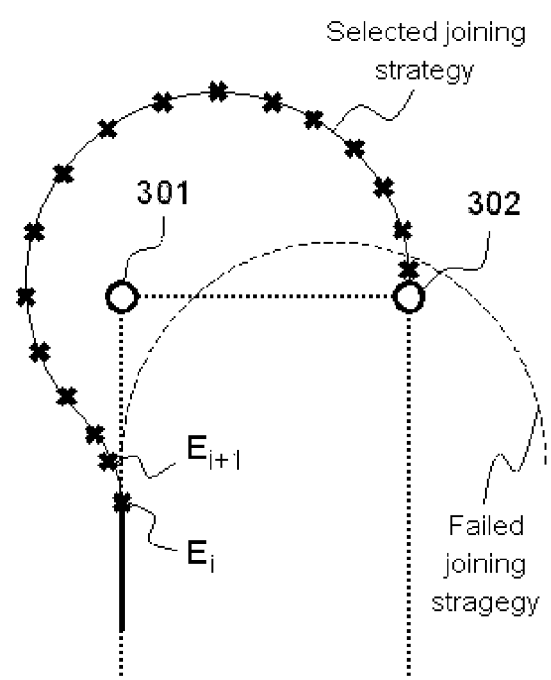

FIG. 3 represents the coordinates of the geographical position of an aircraft in a datum related to a geoid of WGS 84 type, FIG. 4 represents the components of the speed vector of an aircraft, FIG. 5 represents a simplified flowchart of the trajectory computation method according to the invention, FIGS. 6a and 6b illustrate by a first example the principle of trajectory computation by the method according to the invention, FIGS. 7a and 7b illustrate by a second example the principle of trajectory computation by the method according to the invention.

For the sake of clarity, the same elements will bear the same reference labels in the various figures.

DETAILED DESCRIPTION

The present invention models a trajectory of an aircraft, not in geometric form, by its position coordinates, as is the case in the known FMS systems, but in the form of a sequence of state vectors $E_i$ describing the evolution of a moving craft over time.

The time is the basis of the sequencement of this state vector. In a possible embodiment of the method, the time is used independently of the state vector; it constitutes a reference towards a state vector instance which is not itself dated. In another embodiment of the method, the time is integrated into the state vector, the list of state vector ordered by their temporal component constituting the trajectory of the aircraft. This second embodiment turns out to be particularly advantageous in the case where a variable time interval between two instances of the state vector is envisaged. These two approaches for indexing the time can be envisaged for the method according to the invention.

Moreover, the time can be expressed in an absolute manner, for example as date and point in time, or in a manner relating to a reference, for example in seconds around a reference date which advantageously becomes an adjustment variable.

Another component of the state vector is the position of the moving craft. The position can be expressed in various ways as a function notably of the choice of the reference frame. By way of example, a possible representation defines a position in a datum related to a geoid of WGS 84 type well known to the person skilled in the art, making it possible to take into account the flattening of the earth at the poles. As illustrated in FIG. 3, the position of a moving craft is characterized by three coordinates:

Latitude 31, angular value expressed in decimal degrees,
Longitude 32, angular value expressed in decimal degrees,
Altitude 33, expressible with respect to the WGS 84 geoid in metres or in feet to comply with aeronautical conventions.

Advantageously, the geographical position of a state vector $E_i$ is characterized by three components $X_i$, comprising a latitude, a longitude and altitude, which are defined in a datum related to a geoid of WGS 84 type. This representation of the position in no way limits the method according to the invention, other datums can be used, for example by using geocentric references.

An additional component of the state vector necessary for the trajectory computation is the speed vector of the moving craft. The speed vector, which defines the attitude of the moving craft in space, can be defined in several ways. As an example, the speed vector is characterized by its norm 41, expressed in metres per second with respect to a datum on the ground, and by its orientation. As represented in FIG. 4, the orientation of the speed vector is preferably characterized by a slope 42, expressed in degrees with respect to a constant altitude trajectory, and by a course 43 expressed in degrees with respect to geographical North.

Advantageously, the speed vector of a state vector $E_i$ is characterized by three components $V_i$, comprising a norm, a slope angle with respect to a constant altitude trajectory, and a course angle with respect to geographical North. Other choices of representation are possible, notably based on the angles of flight mechanics from an aerodynamic point of view (incidence, roll and trim). The choice adopted here is guided by the wish to define an attitude in the least constraining manner possible, by isolating this definition to the maximum from the aspects which would be specific to a type of moving craft.

A benefit sought by the vector trajectory representation is that of employing a flexible structure that is easily adaptable to a change in needs, or in the capability of the carrier aircraft. This initial list consisting of time, position and speed vector can be supplemented with additional parameters.

Another possible component of the state vector is notably the mass of the aircraft on the trajectory. By taking into account in the computation of the trajectory models of fuel consumption and/or performance of the aircraft as a function of its mass, the method makes it possible to represent a trajectory commonly called 5D, including time, mass and 3D position. Advantageously, the state vectors $E_i$ also have as component a mass $m_i$ of the aircraft.

Other extra parameters that may be integrated into the state vector comprise notably:

Applicable local conditions, for example wind, static pressure, and/or the temperature, encountered by the aircraft on the trajectory. For wind, a possible implementation consists in adding the force and the direction of the wind from among the components of the state vector. Another implementation consists in advising at one and the same time the aircraft speed with respect to the ground datum, and with respect to the air mass traversed. The applicable local conditions can be in a general manner estimated by models, or determined by sensors.

The configuration of the aircraft, in particular the characteristics having a direct influence on its performance. This notably includes:

The aerodynamic configuration of the carrier, notably in the case of an aeroplane equipped with lift-enhancing devices,
Faults affecting the performance, for example a faulty engine, a disabled control surface, thereby making it possible to model degraded cases of flight,
A context of use which will for example govern the possibilities of evolution (regulatory categories of normal use, utility, etc.).

Advantageously, the state vectors $E_i$ also have as component a magnitude characteristic of the wind in the environment of the aircraft, or a magnitude characteristic of the aerodynamic configuration of the aircraft.

FIG. 5 represents a simplified flowchart of the trajectory computation method according to the invention. The trajectory is defined by a sequence of state vectors describing the evolution of the aircraft over time. The method for constructing the trajectory determines a state vector $E_{i+1}$ on the basis of the state vector $E_i$ preceding it in the sequence. Thus, a first initialization step 100 ensures the acquisition of the components of the state vector $E_i$, this step can also be configured to ensure that the necessary outside information is available.

To determine the state vector $E_{i+1}$, the method actually relies on several support functions. In particular, a processing function for the flight plan 101 makes it possible to determine, on the basis of the flight plan FPLN 110 advised by the pilot, a sequence of objective navigation points $S_{PNO}$. Each of the objective navigation points is characterized at least by a 3D geographical position, typically a latitude, a longitude and an altitude. An objective navigation point can also be characterized by additional parameters, for example a speed setpoint, a maximum-slope climb setpoint, or a setpoint for tracking a heading. The sequence $S_{PNO}$ of objective navigation points thus defines a skeletal trajectory, the support of the trajectory computation as is described subsequently. Thus, a moving craft travelling along the trajectory seeks to successively join each of the objective navigation points of the sequence $S_{PNO}$.

The method also relies on a function 102 which defines a flight domain $D_V$, for example with the help of a database PERF DB 150. This flight domain $D_V$ comprises a set of aerodynamic parameters of the aircraft; these parameters make it possible to define the behaviour of the aircraft and are implemented for the computation of a flyable trajectory. In a preferred implementation of the invention, the function 102 ensures the interface between an existing database, for example of PERF DB type 150 of a contemporary FMS system, and the trajectory computation. Typically the function 102 makes it possible to deliver, in a format compatible with the trajectory computation, parameters such as:

Maximum speed
Radius of curvature
Permissible load factor
Category of use of the aircraft (Utility/Normal/Military)
Maximum permissible roll
Minimum speed with stall margin
Stated otherwise, the method for constructing a flight trajectory according to the invention relies on several functions deployed in the flight management system hosting the method. This comprises in particular functions able to:

determine, on the basis of a flight plan advised by the pilot, a sequence $S_{PNO}$ of objective navigation points; an objective navigation point being characterized at least by a geographical position, determine a flight domain $D_V$ consisting of a set of parameters defining the aerodynamic behaviour of the aircraft.

After the initialization step 100, the method for constructing the trajectory successively defines the various components of the vector $E_{i+1}$. The time $t_{i+1}$ is determined on the basis of $t_i$ as a function of the time interval dt chosen for the computation. It is possible to employ a fixed time interval or advantageously a variable time interval; it is notably possible to implement a time interval varying as a function of a gradient of speed or of position between two state vectors with the aim of refining the computation in the strongly transient portions.

The components of the speed vector $V_{i+1}$ of the state vector $E_{i+1}$ are determined in a step 103, consisting of four sub-steps 104, 105, 106 and 107. We shall detail these four intermediate steps.

Firstly, the computation step 104 determines a flight setpoint on the basis of the current state vector $E_i$ and of the sequence $S_{PNO}$ of objective navigation points. The flight setpoint is an objective navigation point of the sequence $S_{PNO}$; it is therefore characterized at least by a 3D geographical position and optionally by additional parameters such as for example a speed setpoint, a maximum-slope climb setpoint, or a setpoint for tracking a heading.

A moving craft travelling along the trajectory seeks to successively join each of the objective navigation points of the sequence $S_{PNO}$. With the state vector $E_i$ is associated a flight setpoint, the computation step 104 determines whether this flight setpoint is retained for the computation of the state vector $E_{i+1}$ or whether it is appropriate to switch to the next objective navigation point in the sequence $S_{PNO}$. Accordingly, the computation step 104 determines whether a set of acknowledgement conditions, associated with the flight setpoint, are satisfied. Typically, an acknowledgement condition can be a distance separating the position of the state vector Ei from the position of the flight setpoint. If this distance is less than a threshold, generally called the acknowledgement distance, the flight setpoint is said to be acknowledged. The flight setpoint becomes the next objective navigation point in the sequence $S_{PNO}$.

The computation of the flight setpoint therefore relies on a list of acknowledgement conditions. These acknowledgement conditions are specific to each of the objective navigation points of the sequence $S_{PNO}$. Among these acknowledgement conditions, a nonlimiting list comprises:

An acknowledgement distance below which the flight setpoint is acknowledged,
An objective altitude is reached,
The point is in the rear sector of the aircraft,
The aircraft is oriented according to an objective course,
A logical combination of the above conditions.

Stated otherwise, to determine the speed components $V_{i+1}$ of the state vector $E_{i+1}$, the computation of the flight setpoint advantageously comprises steps consisting in:

associating acknowledgement conditions with the flight setpoint of the preceding state vector $E_i$,
determining whether these acknowledgement conditions are satisfied,
determining the flight setpoint of the state vector $E_{i+1}$ as being:
the flight setpoint of the preceding state vector $E_i$ in the case of unsatisfied acknowledgement conditions,
the next objective navigation point in the sequence $S_{PNO}$ in the case of satisfied acknowledgement conditions;
the acknowledgement conditions comprising at least one threshold of distance between the geographical position of the preceding state vector $E_i$ and of its flight setpoint.

In the computation step 105 a joining strategy is determined which, starting from the current position, seeks to reach the flight setpoint determined in the preceding computation step. Accordingly, the computation relies on the current state $E_i$, on the flight domain $D_V$, and on a predefined library $L_{Sr}$ of joining strategies.

For example, for a flight setpoint defining a geographical position situated on the heading of the trajectory and at a higher altitude, the computation selects from the library $L_{Sr}$ the joining strategies making it possible to modify the altitude, these strategies are graded and prioritized as a function of the current state, of the flight setpoint (e.g. computation of a slope between current state and objective point), and as a function of the flight domain (e.g. maximum slope of aircraft climb).

The library of joining strategies LSr comprises by way of nonlimiting example the following joining strategies:

Strategy for joining a point by default (the aircraft seeks to aim at the point to the best of its capabilities)
Strategy for managing the unreachable points (anticipation of the turning radii and counter-deflection if the point is not directly accessible)
Joining strategy at 45° for a segment
Strategy for choosing the turning circles so as to reach a point with a given short-range course while minimizing the manoeuvring zone
Strategy for choosing the turning circles so as to reach a point with a given short-range course while avoiding crossing the exit axis
Strategy for anticipating the wind so as to maintain a circular trajectory while remaining within the limitations of the aircraft
Stationary holding strategy (or ascending/descending stationary strategy)
Strategy for choosing entry to a holding circuit.
Strategy for exiting a holding circuit.
Strategy for joining a point while minimizing the "Cross Track Error" or CTE; for which CTE represents the error in lateral positioning of an aircraft with respect to its ideal trajectory. Mathematically, this entails orthogonally projecting the current position of the aircraft onto the trajectory that it is supposed to follow. The CTE is then the distance between the actual position of the aircraft and its projection on the trajectory.

Advantageously, the computation of the joining strategy comprises steps consisting in:

devising a list of joining strategy from among a predefined library $L_{Sr}$ of joining strategies, as a function of the preceding state vector $E_i$ and of the flight setpoint,
grading and prioritizing each of the joining strategies of the list, as a function of the preceding state vector $E_i$, of the flight setpoint and of the flight domain $D_V$,
selecting the joining strategy of highest priority.

The computation step 106 determines an aircraft manoeuvre on the basis of the joining strategy selected, of the current state $E_i$ and of the flight domain $D_V$. An aircraft manoeuvre is characterized by a set of manoeuvre parameters which dictate the aerodynamic behaviour of the aircraft on the basis of the current state. For a commercially operated aircraft, a manoeuvre is characterized by parameters of the pitch, roll, yaw, thrust type, etc.

An advantage of this gradual computation by means of the vector representation is that all the details of the moving craft are known at the start of the manoeuvre. One therefore possesses all the data required for the computation of the manoeuvre in an explicit manner and without making any assumption. Moreover, the means are available for varying the computation intervals as a function of the type of evolution and of the expected precision of the mathematical models used. For example, during level cruising flight, the models are precise and the changes evolve slowly, a relatively long computation interval can be adopted, making it possible to reduce the computation time with no appreciable impact on precision. For more dynamic manoeuvres, where a small initial discrepancy may cause the solution to diverge, a finer computation interval can be adopted, allowing fine modelling of the phenomena at play.

Finally, in a computation step 107 the components of the speed vector $V_{i+1}$ of the state vector $E_{i+1}$ are determined on the basis of the parameters defining the manoeuvre of the aircraft. As has been described, the speed vector is preferably characterized by its norm and its attitude, defined by a slope angle and a course angle.

The other components of the state vector $E_{i+1}$ are determined after the components of the speed vector. In a computation step 108, the geographical position components $X_{i+1}$ of a state vector $E_{i+1}$ are determined by integration on the basis of its speed components $V_{i+1}$ and of the preceding state vector $E_i$. Several integration schemes are possible according to the invention. In a preferred implementation, the geographical position components $X_{i+1}$ of a state vector $E_{i+1}$ are determined by an Euler scheme by means of the following relation:

$$X_{i+1} = X_i + \tfrac{1}{2} * (V_i V_{i+1}) * (t_{i+1} - t_i)$$

in which $t_{i+1}$, $X_{i+1}$, $V_{i+1}$ are the time, geographical position and speed components of the state vector $E_{i+1}$; and $t_i$, $X_i$, $V_i$ are the time, geographical position and speed components of the preceding state vector $E_i$ in the sequence.

Other integration schemes can be envisaged according to the invention for determining the position of the moving craft on the basis of its speed components and of the position and speed information of the preceding state. This may notably be a scheme of Runge-Kutta type.

In a step 109, the other components of the state vector $E_{i+1}$ are determined. In particular, the mass component $m_{i+1}$ is determined as a function of the position components $X_{i+1}$ and speed components $V_{i+1}$. Diverse modellings are possible for the computation of the mass. Advantageously, the mass component $m_{i+1}$ of a state vector $E_{i+1}$ is determined by a fuel consumption computation, related to the displacement of the moving craft from the state $E_i$ to the state $E_{i+1}$, for example by means of a Breguet formula.

The trajectory computation method can therefore be implemented according to several variants described hereinbelow. These variants of the method have in common a step of computing a sequence of state vectors $E_i$ representing the trajectory of the aircraft; the said state vectors $E_i$ having as components, at least a time $t_i$, a geographical position $X_i$ and components of a speed vector $V_i$ of the aircraft; a state vector $E_{i+1}$ being determined on the basis of the state vector $E_i$ preceding it in the sequence by means of:
  a step of computing the components of the speed vector $V_{i+1}$ consisting in:
    determining a flight setpoint, by selecting an objective navigation point from the sequence $S_{PNO}$,
    determining a joining strategy adapted to the flight setpoint and to the flight domain $D_V$ by means of a predefined library $L_{Sr}$ of joining strategies,
    determining a manoeuvre by means of the flight domain $D_V$, allowing the aircraft to follow the joining strategy towards the flight setpoint,
  a step of computing the other components of the state vector $E_{i+1}$, on the basis of the components of the speed vector $V_{i+1}$ and of the components of the preceding state vector $E_i$.

FIGS. 6a and 6b illustrate by a first example the principle of trajectory computation by the method according to the invention. This example corresponds to the case described in FIG. 2a which, leads for a flight management system of the prior art, to a discontinuity of so-called "Bird" type.

It is sought to construct a trajectory on the basis of a flight plan defining, as described in FIG. 6a, a rectilinear segment 13 up to the point 11 and a rectilinear segment 15 from the point 12.

The principle of the trajectory computation by the method according to the invention is described in FIG. 6b. The trajectory consists of a sequence of state vectors represented by crosses in the figure. The trajectory is computed step by step, from one state vector to the next. The processing function for the flight plan 101 determines, on the basis of this flight plan, two objective navigation points 201 and 202; the point 201 being characterized by the geographical coordinates of the point 11 as well as by a heading tracking constraint for the segment 13; the point 202 being characterized by the geographical coordinates of the point 12 as well as by a heading tracking constraint for the segment 15. The principle of the computation is described by means of the state vectors $E_i$, $E_{i+1}$, $E_j$ and $E_{j+1}$ represented in the figure:
  for the state vector $E_i$: the flight setpoint is the objective navigation point 201, the joining strategy determined consists simply in ensuring the tracking of heading along the segment 13,
  for the state vector $E_{i+1}$: the distance separating the position of the vector $E_i$ from the objective navigation point 201 is less than a predetermined acknowledgement distance, the flight setpoint switches to the objective navigation point 202. The joining strategy selected is in this case a turning setpoint allowing the aircraft to join the objective navigation point 202. An aircraft manoeuvre is defined in accordance with the aircraft's flight domain for carrying out this turning, the speed vector $V_{i+1}$ is determined for this manoeuvre, the resulting trajectory deviates from the segment 13 by veering towards the point 12. The trajectory computation continues up to the point $E_j$,
  for the state vector $E_{j+1}$: the flight setpoint is still the objective navigation point 202. Among the graded joining strategies, a strategy making it possible to fulfil the objective of tracking the heading along the segment 15 now takes priority with respect to the previously adopted joining strategy which consisted in steering towards the point 202. A manoeuvre is defined for this new joining strategy, the speed vector $V_{i+1}$ is determined for this manoeuvre, the trajectory deviates from the point 12 and seeks to join the segment 15.

FIGS. 7a and 7b illustrate by a second example the principle of trajectory computation by the method according to the invention. This example corresponds to the case described in FIG. 2b which leads, for a flight management system of the prior art, to a discontinuity of so-called "Fish" type.

It is sought to construct a trajectory on the basis of a flight plan defining, as described in FIG. 7a, a rectilinear segment 23 up to the point 21 and a rectilinear segment 25 from the point 22.

The principle of the trajectory computation by the method according to the invention is described in FIG. 7b. The processing function for the flight plan 101 determines, on the basis of this flight plan, two objective navigation points 301 and 302; the point 301 being characterized by the geographical coordinates of the point 21 as well as by a heading tracking constraint for the segment 23; the point 302 being characterized by the geographical coordinates of the point 22 as well as by a heading tracking constraint for the segment 25. The principle of the computation is described by means of the state vectors $E_i$, $E_{i+1}$ represented in the figure:

for the state vector $E_i$: the flight setpoint is the objective navigation point 301, the joining strategy determined consists simply in ensuring the tracking of the heading along the segment 23, for the state vector $E_{i+1}$: the distance separating the position of the vector $E_i$ from the objective navigation point 301 is less than a predetermined acknowledgement distance, the flight setpoint switches to the objective navigation point 302. Several joining strategies are graded. A first strategy which consists in turning towards the objective point does not make it possible, within the limits of the aircraft's flight domain, to join the point 302. A second strategy which consists within a first time in deviating from the objective navigation point before turning towards this point according to a minimum radius of curvature defined by the flight domain is then selected. An aircraft manoeuvre is defined in accordance with the flight domain of the aircraft, the speed vector $V_{i+1}$ is determined for this manoeuvre, the resulting trajectory deviates from the segment 23 by moving away from the point 22 until a point is reached which makes it possible by turning with a smaller radius of curvature to reach the point 22. The trajectory computation continues until the point 22 is reached.

As illustrated by FIGS. 6a, 6b, 7a and 7b, the trajectory computation by the method according to the invention is advantageously carried out in a single pass. In contradistinction to the FMS systems of the prior art, it does not require any iteration between a "forward" computation and a "backward" computation. The computation is performed gradually, from the current position of the aircraft. The advantages of this approach are numerous, firstly it circumvents the convergence difficulties mentioned previously by ensuring the absence of discontinuity during the trajectory. By limiting the computations by an aircraft performance model, the method also makes it possible to ensure that the trajectory is flyable. The position and the aircraft attitude are dated with respect to one another in a relative manner, making it possible to integrate 4D constraints ab initio.

It is moreover possible to optimize the computations of the trajectory by carrying them out only when the moving craft deviates beyond a certain threshold from this trajectory. By way of example, if the moving craft is simply delayed on the trajectory, the other parameters remaining compliant, it is not necessary to recompute the trajectory, but simply to shift the time origin, thereby making it possible to greatly optimize the computation times.

By using a performance model that integrates the aircraft's fuel consumption, the scheme makes it possible to obtain a 5D definition of the trajectory in a single pass.

Moreover, the method, starting from the current position of the aircraft, provides, without specific processing, a "short-term" trajectory in a much reduced time. This is an appreciable advantage with respect to the conventional approaches which require the consideration on the one hand of a short-term trajectory for the purposes of fast availability, and on the other hand of a long-term trajectory to ensure overall navigation. Within the framework of the invention, as a function of the time allowed to solve the computation, either the short-term trajectory will be obtained very rapidly, or by allowing the computation to go to term, the trajectory up to the destination will be obtained, with an equal degree of precision over the whole of the path.

Finally, another advantage of this approach of simulation type is that it is compatible at one and the same time with a need to construct a trajectory for prediction purposes (functions TRAJ 120 and PRED 140 of the FMS systems described in FIG. 1), but also with the actual guidance of the aircraft on this trajectory (function GUID 200). It is thus possible to communalize the code between these two distinct functions.

The invention also pertains to a flight management system comprising instructions of codes making it possible to perform the steps of the trajectory construction method having the characteristics described above.

The invention claimed is:

1. A computer implemented method for constructing a flight trajectory of an aircraft, deployed in a flight management system, said flight management system configured to determine, on the basis of a flight plan advised by the pilot, an objective navigation point sequence (SPNO), an objective navigation point being characterized at least by a geographical position, and configured to determine a flight domain ($D_v$) consisting of a set of parameters defining an aerodynamic behaviour of the aircraft, said flight trajectory being defined as a sequence of state vectors, the method comprising two successive steps:

first computing, with the flight management system, state vectors representing the trajectory of the aircraft; the state vectors having as components at least a time ($t_i$), a geographical position ($X_i$) of the aircraft and components of a speed vector ($V_i$) of the aircraft;

a state vector ($E_{i+1}$) being determined on a basis of the preceding state vector ($E_i$) preceding it in a sequence by:
computing the components of a following speed vector ($V_{i+1}$), including:
determining a flight setpoint, by selecting an objective navigation point from the objective navigation point sequence ($S_{PNO}$), then
determining a joining strategy adapted to the flight setpoint and to the flight domain ($D_v$) by means of a predefined library ($L_{sr}$) of joining strategies, then
determining a manoeuvre by means of the flight domain ($D_v$), allowing the aircraft to follow the joining strategy towards the flight setpoint, and second computing, with the flight management system, other components of the state vector ($E_{i+1}$), on a basis of the components of the following speed vector ($V_{i+1}$) and components of the preceding state vector ($E_i$) in the sequence proceeding it in the sequence.

2. The method according to claim 1, wherein the computation of the flight setpoint comprises computation steps comprising:

associating acknowledgement conditions with the flight setpoint of the preceding state vector ($E_i$), determining whether the acknowledgement conditions are satisfied, determining the flight setpoint of the state vector ($E_{i+1}$) as being:
the flight setpoint of the preceding state vector ($E_i$) in the case of unsatisfied acknowledgement conditions, and
a next objective navigation point in the sequence (SPNO) in the case of satisfied acknowledgement conditions;

the acknowledgement conditions comprising at least one threshold of distance between a geographical position of the preceding state vector ($E_i$) and of its flight setpoint.

3. The method according to claim 1, wherein the computation of the joining strategy comprises computation steps comprising:
devising a list of joining strategies from among a predefined library ($L_{Sr}$) of joining strategies, as a function of the preceding state vector ($E_i$) and of the flight setpoint,
grading and prioritizing each of the joining strategies of the list as a function of the preceding state vector ($E_i$), of the flight setpoint and of the flight domain ($D_v$), and
selecting the joining strategy of highest priority.

4. The method according to claim 1, wherein the geographical position of a state vector ($E_i$) is characterized by three components ($X_i$), comprising a latitude, a longitude and altitude, which are defined in a datum related to a geoid of WGS 84 type.

5. The method according to claim 1, wherein the speed vector of a state vector ($E_i$) is characterized by three components ($V_i$), comprising a norm, a slope angle with respect to a constant altitude trajectory, and a course angle with respect to geographical North.

6. The method according to claim 1, wherein the state vectors ($E_i$) also have as component a mass ($m_i$) of the aircraft.

7. The method according to claim 6, wherein the mass component ($m_{i+1}$) of a state vector ($E_{i+1}$) is determined by a fuel consumption computation.

8. The method according to claim 1, wherein the state vectors ($E_i$) also have as component a magnitude characteristic of wind in an environment of the aircraft, or a magnitude characteristic of an aerodynamic configuration of the aircraft.

9. The method according to claim 1, wherein a geographical position components ($X_{i+1}$) of a state vector ($E_{i+1}$) are determined by integration on a basis of its speed components ($V_{i+1}$) and of the preceding state vector ($E_i$).

10. The method according to claim 8, wherein the geographical position components ($X_{1+1}$) of a state vector ($E_{1+1}$) are determined by an Euler scheme by means of the following relation:

$$X_{i+1} = X_i + \frac{1}{2} * (V_i + V_{i+1}) * (t_{i+1} - t_i)$$

in which $t_{i+1}$, $X_{i+1}$, $V_{i+1}$ are the time, geographical position and speed components of the state vector $E_{i+1}$; and $t_i$, $X_i$, $V_i$ are the time, geographical position and speed components of the preceding state vector $E_i$.

11. A flight management system comprising instructions of codes making it possible to perform the steps of the computer implemented method for constructing a flight trajectory of an aircraft according to claim 1.

* * * * *